(12) United States Patent
Matsumoto et al.

(10) Patent No.: US 8,487,285 B2
(45) Date of Patent: Jul. 16, 2013

(54) DEEP-ULTRAVIOLET LIGHT SOURCE CAPABLE OF STOPPING LEAKAGE OF HARMFUL X-RAYS

(75) Inventors: Takahiro Matsumoto, Yokohama (JP); Sho Iwayama, Yokohama (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 13/428,987

(22) Filed: Mar. 23, 2012

(65) Prior Publication Data

US 2012/0241651 A1 Sep. 27, 2012

(30) Foreign Application Priority Data

Mar. 23, 2011 (JP) .................. 2011-063651

(51) Int. Cl.
*G21K 5/02* (2006.01)

(52) U.S. Cl.
USPC .............. 250/504 R; 250/492.1; 250/492.2; 250/492.3; 250/493.1; 250/503.1

(58) Field of Classification Search
USPC .......... 250/492.1, 492.2, 492.3, 493.1, 503.1, 250/504 R
See application file for complete search history.

(56) References Cited

U.S. PATENT DOCUMENTS

2009/0184644 A1  7/2009  Korber et al.

FOREIGN PATENT DOCUMENTS

| JP | 5-54857 A | 3/1993 |
|---|---|---|
| JP | 5-217552 A | 8/1993 |
| JP | 6-96609 A | 4/1994 |
| JP | 2001077420 A * | 3/2001 |
| JP | 2006-12586 A | 1/2006 |
| JP | 2007-518236 A | 7/2007 |

OTHER PUBLICATIONS

K. Watanabe et al; Far-Ultraviolet Plane-Emission Handheld Device Based on Hexagonal Boron Nitride; Nature Photonics; vol. 3, Oct. 2009, pp. 591-594.

T. Oto et al; 100mw Deep-Ultraviolet Emission From Aluminum-Nitride-Based Quantum Wells Pumped by an Electron Beam; Nature Photonics; Sep. 26, 2010 Published Online.

* cited by examiner

*Primary Examiner* — Michael Logie
(74) *Attorney, Agent, or Firm* — Holtz, Holtz, Goodman & Chick, PC

(57) ABSTRACT

In a deep-ultraviolet tight source includes sapphire substrate, a wide band gap semiconductor layer having a wavelength smaller than 300 nm, formed on the sapphire substrate, and en electron beam source for irradiating the wide band gap semiconductor layer with an electron beam. The wide band gap semiconductor layer is configured to be irradiated with the electron beam to emit deep-ultraviolet light through the sapphire substrate. A thickness $t_1$ of the sapphire substrate satisfies: $t_1 \geq \alpha \cdot E^3$ is an energy of the electron beam (keV); and $\alpha$ is 1 $\mu m/(keV)^3$.

10 Claims, 18 Drawing Sheets

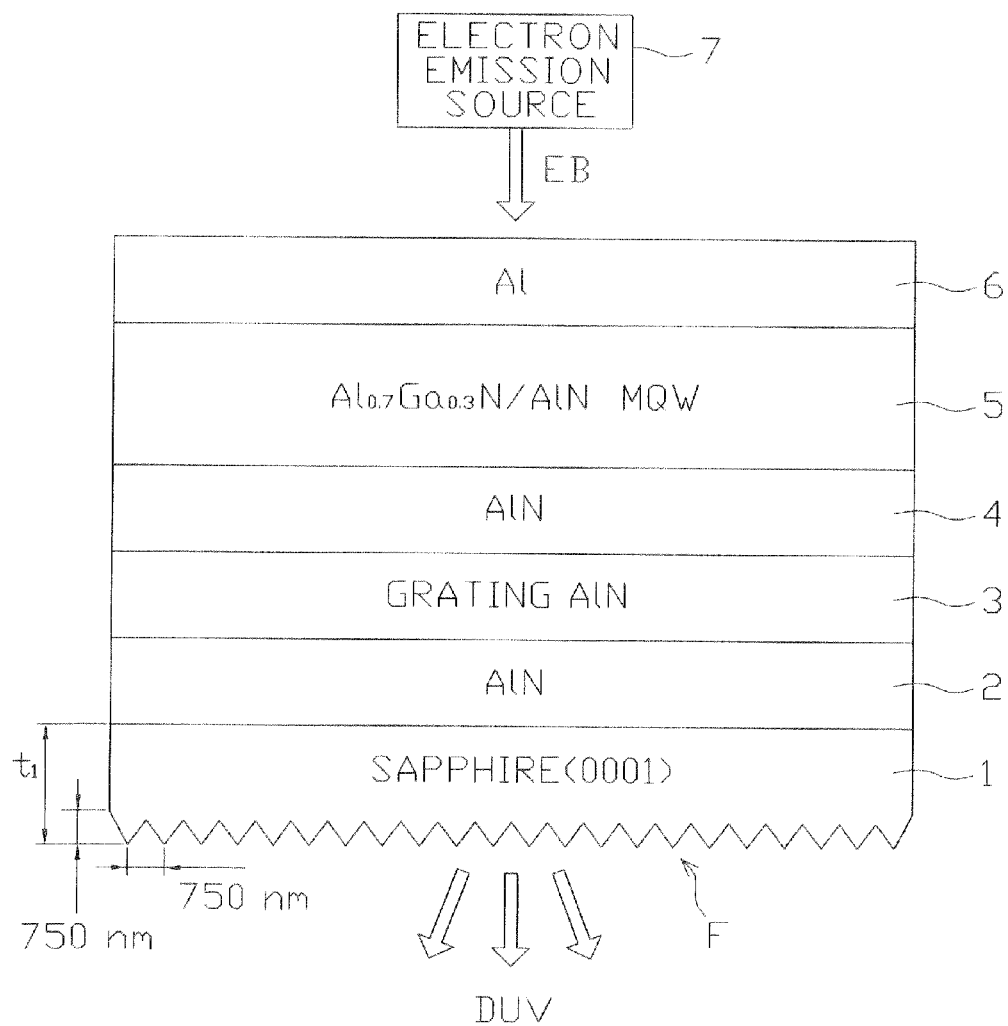

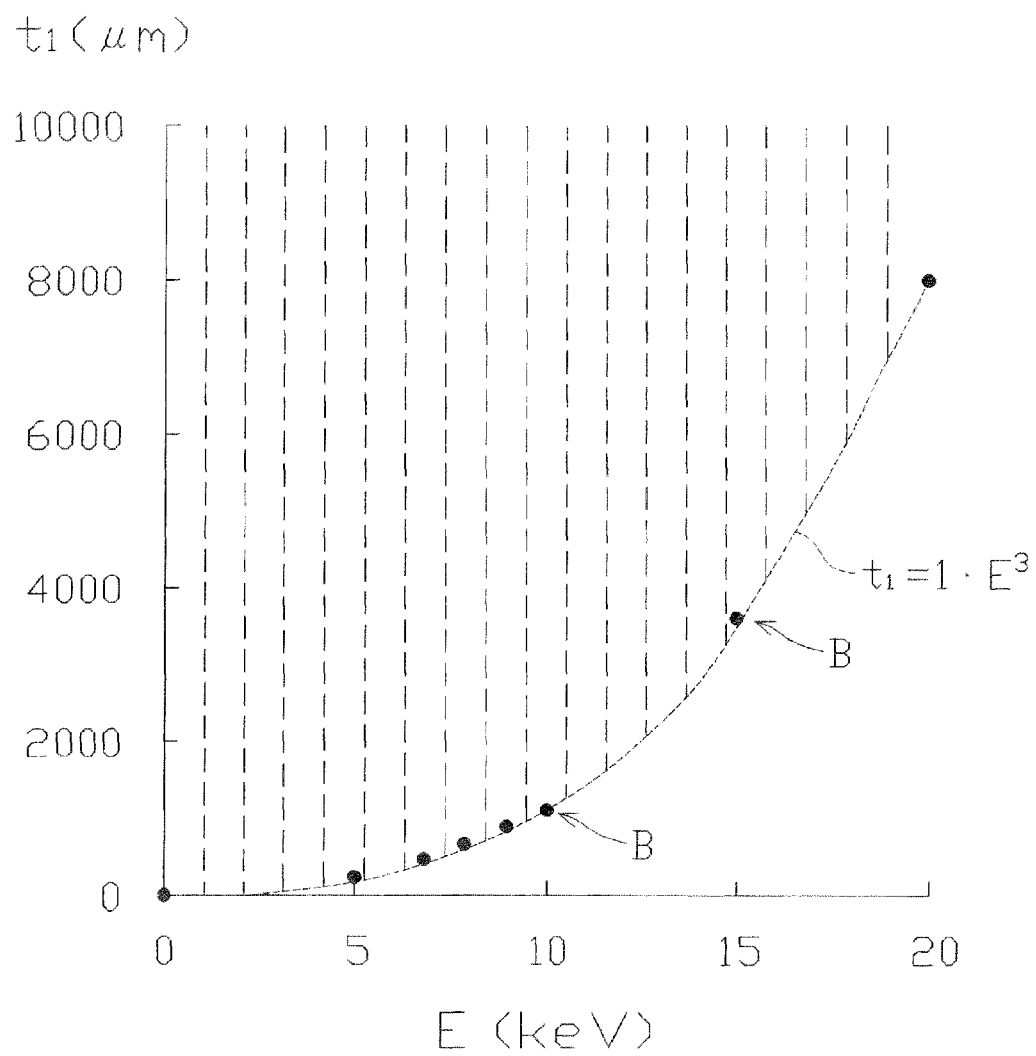

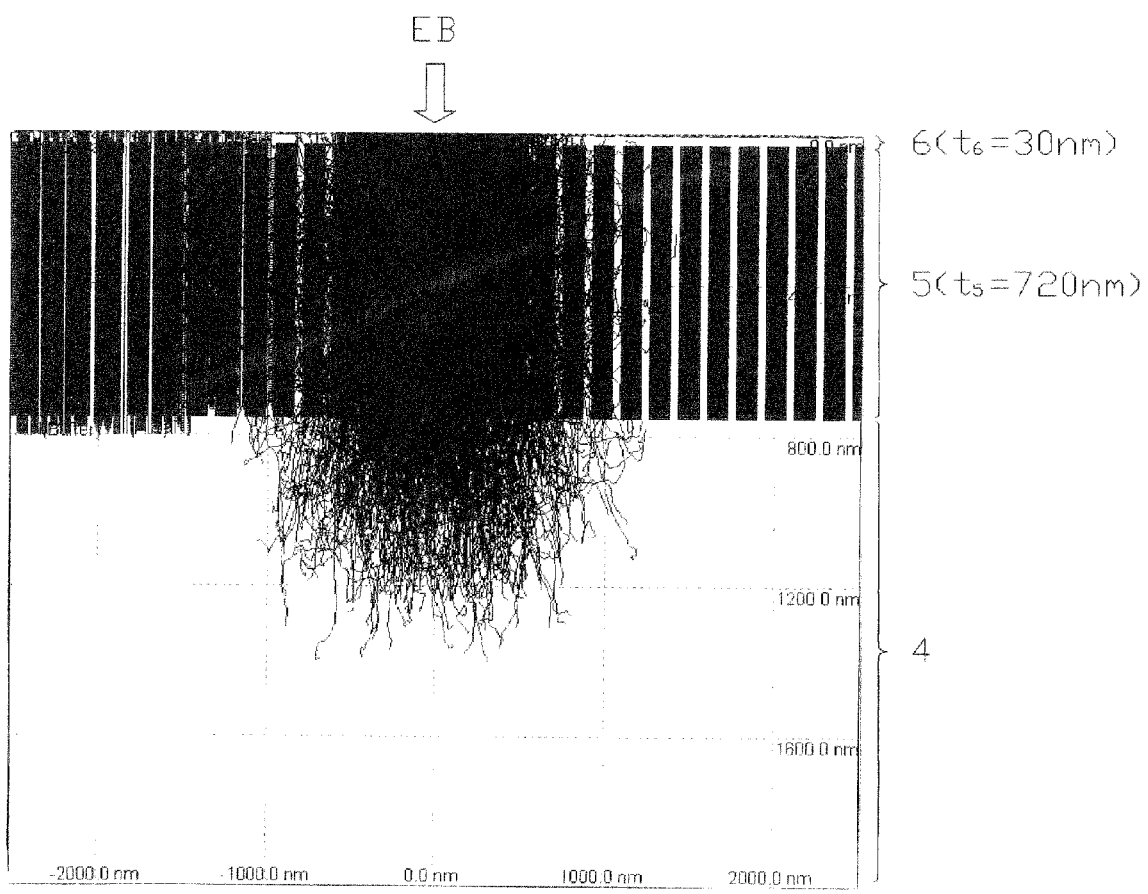

E = 2 keV

E = 3 keV

Fig. 10A
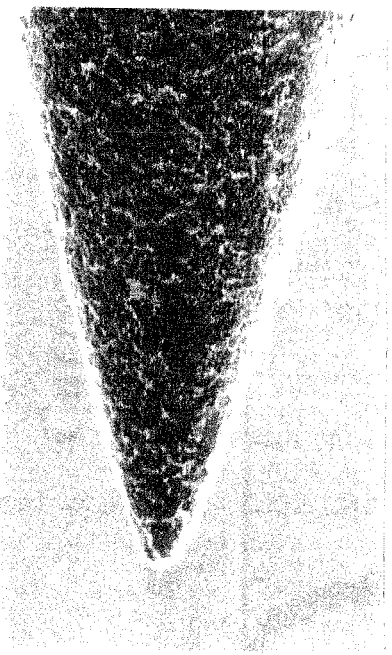
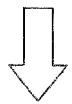
Fig. 10B
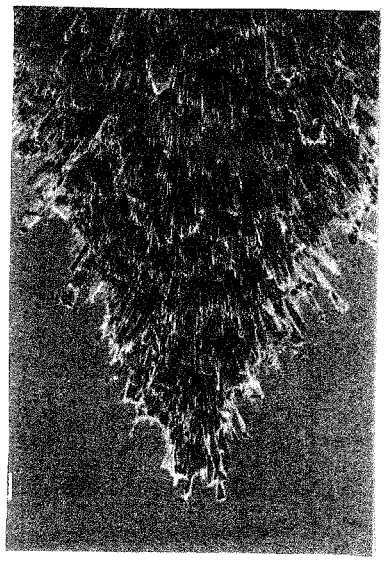
50 μm

DEEP-ULTRAVIOLET LIGHT SOURCE CAPABLE OF STOPPING LEAKAGE OF HARMFUL X-RAYS

This application claims the priority benefit under 35 U.S.C. §119 to Japanese Patent Application No. JP2011-063651 filed on Mar. 23, 2011, which disclosure is hereby incorporated in its entirety by reference.

BACKGROUND

1. Field

The presently disclosed subject matter relates to deep-ultraviolet light source used for various applications including disinfection, sterilization and water purification, or in semiconductor manufacturing processes and so on.

2. Description or the Related Art

Generally, deep-ultraviolet, light sources of an about 200 to 260 nm wavelength range have been broadly used as disinfection light sources, sterilization light sources and water purification light sources, or in semiconductor manufacturing processes.

A first prior art deep-ultraviolet light source is a low pressure mercury discharge apparatus using a hot cathode (see: JP5-54857, JP5-217552 & JP6-96609). That is, an anode electrode and a cathode electrode are inserted at ends of a glass discharge tube, and noble gas such as argon (Ar) or neon (Ne) in a low pressure state is sealed in the glass discharge tube. Then, when an about 50 kHz AC voltage is applied between the anode electrode and the cathode electrode, electrons collide with noble gas which also collides with mercury. As a result, mercury is excited to start discharge. In this discharge, a 254 nm wavelength deep-ultraviolet light is emitted from the excited mercury.

In the above-described first prior art deep-ultraviolet light source, however, since harmful mercury is included, it is not preferable in view of eco-efficiency. Also, since the ultraviolet emission intensity depends upon the vapor pressure of mercury which is low, the ultraviolet emission intensity is low. Further, the ultraviolet emission intensity depends upon the environmental temperature. In this case, when the environmental temperature is very low, the ultraviolet, emission intensity is extremely low. On the other hand, when the environmental temperature is higher than 60° C. the ultraviolet emission intensity is also low. Therefore, the optimum environmental temperature range is very small, i.e., from room temperature to 60° C. Further, the rising time period of the ultraviolet emission intensity is long. Still further, the ultraviolet emission efficiency is low. Finally, since the drive voltage is high, the electromagnetic noise is large.

A second prior art deep-ultraviolet light source is a low pressure mercury discharge apparatus using a cold cathode (see: JP2006-12586). This second prior art deep-ultraviolet light source has an advantage in that the ultraviolet emission efficiency is larger than that of the first prior art deep-ultraviolet light source.

However, the above-described second prior art deep-ultraviolet light source still has the same disadvantages as in the first prior art deep-ultraviolet light source except for the ultraviolet emission efficiency.

A third prior art deep-ultraviolet light source is a high pressure mercury discharge apparatus using a hot cathode (see: US Patent Application Publication No. 2009/0184644A1 & JP2007-5182369). That is, noble gas including mercury in a high-pressure state is sealed in a glass discharge tube to enhance the ultraviolet emission intensity.

In the above described third prior art deep-ultraviolet light source, obtained ultraviolet emission intensity is high due to the high pressure of mercury gas; however, the ultraviolet emission efficiency is low because the conversion efficiency from the input electric power to the ultraviolet emission energy is low. Also, the lifetime would be shortened to about 1000 hours. Further, since a circuit for generating a high voltage discharge is required, this deep-ultraviolet light source is high in cost. Still further, in the same way as in the first prior art deep-ultraviolet light source, since harmful mercury is included, it is not preferable in view of eco-efficiency, and since the drive voltage is high, the electromagnetic noise is large.

A fourth prior art deep-ultraviolet light source excites, i.e., pumps a wide band gap semiconductor, i.e., hexagonal boron nitride (hBN) powder including no harmful mercury by an electron beam to emit a 225 nm wavelength deep-ultraviolet light from the excited hBN powder (see: Kenji Watanabe et al., "Far-ultraviolet plane emission handheld device based on hexagonal boron nitride", Nature Photonics, Vol. 3, 591, October 2009).

In the above-described fourth prior art deep-ultraviolet light source, however, since the self-absorption of light is large and the rate of radiation recombination is small, the ultraviolet emission efficiency is low.

A fifth prior art deep-ultraviolet light source excites, i.e., pumps a wide band gap semiconductor, i.e., $Al_xGa_{1-x}N$/AlN multiple quantum well (MQW) layer including no harmuful mercury by an electron beam to emit a 240 wavelength deep-ultraviolet light from the excited MQW layer (see: Takao Oto et al., "100 mW deep-ultraviolet emission from aluminium-nitride-based quantum wells pumped by an electron beam", Nature photonics, Vol. 4, 767, September 2010).

More concretely, an AlN layer is formed on a sapphire (0001) substrate, and an $Al_{0.69}Ga_{0.31}N$ (1 nm thick well)/AlN (15 nm thick barrier) MQW layer is grown on the AlN layer. This MQW layer suppresses the self-absorption of light by the $Al_{0.69}Ga_{0.31}N$ well layers to enhance the ultraviolet emission efficiency.

The above-described fifth prior art deep-ultraviolet light source, however, has the following problems.

Firstly, the MQW layer pumped by art electron beam generates a harmful X-ray in addition to the deep-ultraviolet light.

Secondly, since the MQW layer has poor conductivity, irradiation of the MQW layer with an electron beam for even a short time period would electrostatically destroy the MQW layer.

Thirdly, the ultraviolet emission efficiency is still low.

Fourthly, an electron emission source for generating an electron beam may be a thermal electron emission source such as a tungsten (W) filament or a cold-cathode electron emission source such as carbon nanotubes (CNTs), however, such an electron emission source has a short lifetime such as 1000 hours. As a result, this deep-ultraviolet light source has a short lifetime. Also, since the thermal electron emission source requires heating power, the ultraviolet emission efficiency would be low. On the other hand, since the cold-cathode electron emission source requires a high vacuum sealing, the manufacturing cost would become high.

SUMMARY

The presently disclosed subject matter seeks to solve one or more of the above-described problems.

According to the presently disclosed subject matter, a deep-ultraviolet light source includes a sapphire substrate, a wide band gap semiconductor layer having a wavelength smaller than 300 nm, formed on the sapphire substrate, and an electron beam source for irradiating the wide band gap semiconductor layer with an electron beam. The wide band gap semiconductor layer is configured to be irradiated with the electron beam to emit deep-ultraviolet light through the sapphire substrate. A thickness $t_1$ of the sapphire substrate satisfies:

$$t_1 \geq \alpha \cdot E^3$$

where E is an energy of the electron beam (keV); and
α is 1 μm/(keV)$^3$.

The sapphire substrate stops harmful X-rays but does not stop the deep-ultraviolet light.

Also, the wide band gap semiconductor layer comprises an $Al_xGa_{1-x}N/AlN$ (0.2≦x≦0.8) multiple quantum well layer consisting of periods each formed by one $Al_xGa_{1-x}N$ well layer and one AlN barrier layer.

Further, a 30 to 60 nm thick aluminum metal back layer is formed on the $Al_xGa_{1-x}N/AlN$ multiple quantum well layer. The aluminum metal back layer prevents the $Al_xGa_{1-x}N/AlN$ multiple quantum well layer from being destroyed due to the electrostatic charges thereof.

Furthermore, a thickness of the $Al_xGa_{1-x}N/AlN$ multiple quantum well layer is 300 to 400 nm, and the energy of the electron beam is 6 to 7 keV. Thus, the ultraviolet emission efficiency becomes maximum.

An electron emission source including a graphite nanometer-order or submicrometer-order needle rod for generating the electron beam is provided. Thus, the required degree of vacuum of a vacuum scaling is decreased, and the lifetime of the electron emission source becomes longer.

According to the presently disclosed subject matter, the leakage of harmful X-rays can be stopped.

BRIEF DESCRIPTION OF THE DRAWINGS

The above and other advantages and features of the presently disclosed subject matter will be more apparent from the following description of certain embodiments, taken in conjunction with the accompanying drawings, wherein:

FIG. 1 is a cross-sectional view illustrating an embodiment of the deep-ultraviolet light source according to the presently disclosed subject matter;

FIG. 2 is a graph for explaining the thickness of the sapphire (0001) substrate of FIG. 1;

FIG. 3 is a result obtained by a Monte Carlo simulation method for explaining the diffusion of electrons of the electron beam of FIG. 1 where the thickness of the aluminum metal back layer is 30 nm, the thickness of the $Al_xGa_{1-x}N/AlN$ MQW layer is 720 nm and the energy of the electron beam is 10 keV;

FIGS. 10A and 10B are a scanning electron microscope (SEM) photographs of the graphite needle rod before and after the plasma etching process of FIG. 9;

DETAILED DESCRIPTION OF EXEMPLARY EMBODIMENTS

Figure 4A:
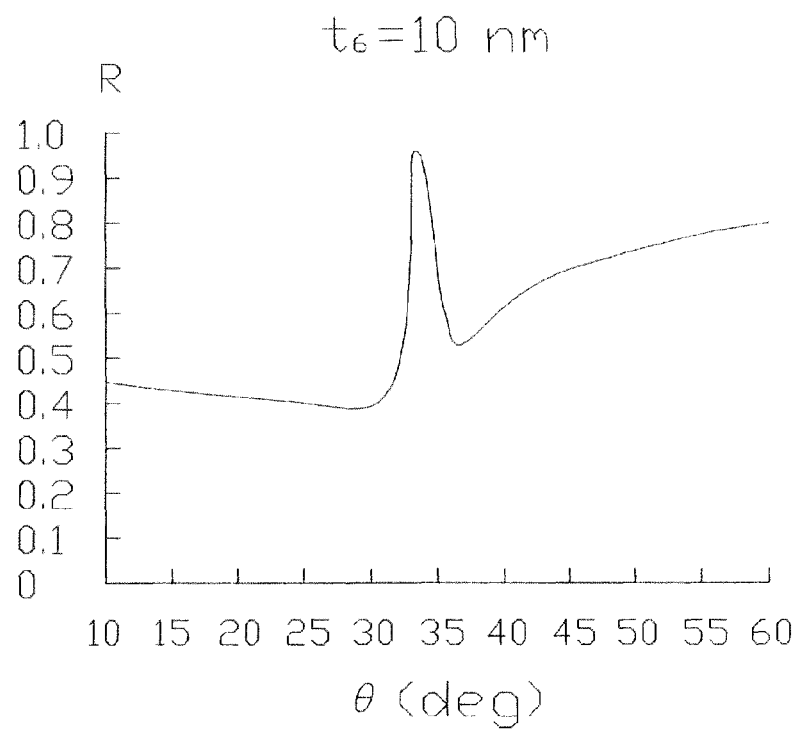
FIGS. 4A, 4B, 4C and 4D are graphs for explaining the dependency of the reflectivity of the aluminum metal back layer of FIG. 1 upon the light incident angle.

In FIG. 1, which illustrates an embodiment of the deep-ultraviolet light source according to the presently disclosed subject matter, this deep ultraviolet light source is constructed by a sapphire (0001) substrate 1, an about 600 nm thick AlN buffer layer 2 formed on the sapphire (0001) substrate 1, an about 3 μm thick grating AlN layer 3 formed on the AlN buffer layer 2, an about 60 nm thick $Al_{0.7}Ga_{0.3}N/AlN$ MQW layer 5 consisting of ten periods of one about 3 nm thick $Al_{0.7}Ga_{0.3}N$ well layer and one about 3 nm thick AlN barrier layer, and an aluminum (Al) metal back layer 6.

In FIG. 1, when the deep-ultraviolet light source of FIG. 1 is irradiated with an electron beam EB emitted from an electron emission source 7, a deep-ultraviolet light DUV is emitted from a light taken-out surface F of the sapphire (0001) substrate 1.

First, the sapphire (0001) substrate 1 is discussed in detail below.

In FIG. 2, each black spot B designates a simulated thickness $t_1$ of the sapphire (0001) substrate 1 when the sapphire (0001) substrate 1 requires a prescribed value of substrate thickness in order to obtain permissible exposure level of X-ray at each electron beam energy E (keV). That is, when the thickness $t_1$ of the sapphire (0001) substrate 1 is larger than a value of the black spot B at the energy E the electron beam EB, the leakage of the X ray can be smaller than the prescribed value. A curve plotted by the black spots B is represented by $$t_1 = \alpha \cdot E^3$$

where α is a constant, in this case, 1 μm/(keV)³. Therefore, in order to satisfy the prescribed value of the leakage of the X-ray, $$t_1 \geq \alpha \cdot E^3$$

That is, the maximum energy of the X-ray generated by bremsstrahlung radiation is the same as the energy E of the electron beam EB. Therefore, for example, when E=6 keV, the thickness $t_1$ of the sapphire (0001) substrate 1 is larger than 216 μm, and when E=10 keV, the thickness $t_1$ of the sapphire (0001) substrate 1 is larger than 1000 μm. Thus, if $t_1 \geq \alpha \cdot E^3$ is satisfied, the intensity of leakage X-ray can be reduced to the permission exposure level.

The light taken-out surface F of the sapphire (0001) substrate 1 is roughened or uneven to a sandysh surface. That is, the deep-ultraviolet light DUV is radiated into the air through the sapphire (0001) substrate 1; however, since the refractive index n of the sapphire (0001) substrate 1 is large, i.e., n=1.84, if the light taken-out surface F of the sapphire (0001) substrate 1 is flattened or mirror shaped, most of the deep-ultraviolet light DUV generated from the $Al_{0.7}Ga_{0.3}N/AlN$ MQW layer 5 is reflected at an interface between the air and the sapphire (0001) substrate 1, i.e., at the flattened light taken-out surface F, so that it is impossible to take the deep-ultraviolet light DUV from the sapphire (0001) substrate 1. Therefore, the light taken-out surface F of the sapphire (0001) substrate 1 is made rough in such a way that the average period is 750 nm or more and the aspect ratio is larger than 1. Thus, the light taken-out efficiency can be improved by 50% or more as compared with the case where the light taken-out surface F is flattened. The roughened light taken-out surface F can be realized by forming a rough photoresist pattern on the sapphire (0001) substrate 1 and performing a reactive ion etching (RIE) process upon the sapphire (0001) substrate t using the rough photoresist pattern as a mask.

Next, the formation of the AlN buffer layer 2, the grating AlN layer 3, the AlN layer 4 and the $Al_{0.7}Ga_{0.3}N/AlN$ MQW layer 5 on the sapphire (0001) substrate 1 is discussed in detail below.

The sapphire (0001) substrate 1 is mounted on an metal organic chemical vapor deposition (MOCVD) apparatus, and a pre-process is performed upon the surface of the sapphire (0001) substrate 1 by supplying hydrogen ($H_2$) gas at a substrate temperature of about 1200° C. for about 10 minutes.

Next, while maintaining the substrate temperature at about 1200° C. in the MOCVD apparatus, trimethylaluminum $(CH_3)_2Al$ gas and ammonia ($NH_3$) gas are supplied thereto at 10 sccm and 5 slm, respectively, to grow an about 600 nm thick AlN buffer layer 2.

Next, while increasing the substrate temperature to about 1300° C. in the MOCVD apparatus, trimethylaluminum $(CH_3)_3Al$ gas and ammonia ($NH_3$) gas are supplied thereto at 10 sccm and 5 slm, respectively, to grow an about 3 μm thick AlN layer.

Next, in order to reduce the dislocation density of an AlN layer 4, which is formed later, by a gas phase epitaxial traverse growth process, a grating structure having a line-and-space period of about 3 μm and a depth of about 500 nm is formed on the 3 μm thick AlN layer 3. Concretely, an about 3 μm wide striped photoresist pattern (not shown) is formed by a photoresist process. Then the 3 μm thick AlN layer is etched by an RIE process using the photoresist pattern as an etching mask. Then, the photoresist pattern is removed by organic solvent or the like. As a result, an uneven (groove) structure having a line-and-space period of about 3 μm and a depth of about 500 nm is formed.

In this embodiment, note that a dot-shaped uneven structure can be used instead of the grating structure.

Next, again while increasing the substrate temperature to about 1300° C. in the MOCVD apparatus, trimethylaluminum $(CH_3)_3Al$ gas and anmonia ($NH_3$) gas are supplied thereto at 10 sccm and 5 slm, respectively, to grow an about 15 μm thick AlN layer 1 which is helpful in improving the property of an $Al_{0.7}Ga_{0.3}N/AlN$ MQW layer 5.

Next, the $Al_xGa_{1-x}N/AlN$ MQW layer 5 is formed on the AlN layer 4. That is, in the MOCVD apparatus, while increasing the substrate temperature at about 1080° C., trimethylaluminum ($(CH_3)_3Al$), trimethylgallium ($(CH_3)_3Ga$) and ammonia ($NH_3$) are supplied thereto at 20 sccm, 8 sccm and 7 slm, respectively, so that the stoichiometric ratio is Al:Ga:N=0.7:0.3:1, to form one about 3 nm thick $Al_{0.7}Ga_{0.3}N$ well layer. Also, the same MOCVD apparatus, while increasing the substrate temperature at about 1200° C., trimethylaluminum ($(CH_3)_3Al$), trimethylgallium ($(CH_3)_3Ga$) and ammonia ($NH_3$) are supplied thereto at 10 sccm, 5 sccm and 7 slm, respectively, so that the stoichiometric ratio is Al:Ga:N=0.7:0.3:1, to form one about 3 nm thick $Al_{0.7}Ga_{0.3}N$ well layer. Thus, 10 to 150 periods each consisting of one 3 nm thick $Al_{0.7}Ga_{0.3}N$ well layer and one 3 nm thick AlN barrier layer are repeated to form the about 60 to 900 nm thick $Al_{0.7}Ga_{0.2}N/AlN$ MQW layer 5.

FIG. 3 is a diagram illustrating the diffusion of electrons of the electron beam EB of FIG. 1 obtained by a Monte Carlo simulation method using the program CASINO (trademark) where the energy E of the electron beam EB is 10 keV, the beam diameter or the electron beam EB is 1 μm, the thickness $t_6$ of the metal back layer 6 is 30 nm, and the thickness $t_5$ of the $Al_{0.7}Ga_{0.3}N/AlN$ MQW layer 5 is 720 nm. As illustrated in FIG. 3, most or electrons of the electron beam EB, i.e., 99% or more of electrons of the electron beam EB is absorbed by the $Al_{0.7}Ga_{0.3}N/AlN$ MQW layer 5. Therefore, if the $Al_{0.7}Ga_{0.3}N/AlN$ MQW layer 5 is thicker than 720 nm, the thicker part of the $Al_{0.7}Ga_{0.3}N/AlN$ MQW layer 5 than 720 nm is useless in view of the manufacturing cost. On the other hand, the $Al_{0.7}Ga_{0.3}N/AlN$ MQW layer 5 is too thin, the $Al_{0.7}Ga_{0.3}N/AlN$ MQW layer 5 cannot absorb the excited energy of the electron beam EB completely, so that the ultraviolet emission intensity of the obtained deep-ultraviolet light DUV is decreased.

In FIG. 3, note that the $Al_{0.7}Ga_{0.3}N/AlN$ MQW layer 5 is illustrated by vertical stripes only for convenience's sake: however, the $Al_{0.7}Ga_{0.3}N$ will layers and the AlN barrier layers are actually stacked along the traverse direction. This is also true in FIGS. 5A, 5B, 5C and 5D which will be discussed later.

The aluminum metal back layer 6 formed on the $Al_{0.7}Ga_{0.3}N/AlN$ MQW layer 5 removes charges at the $Al_{0.7}Ga_{0.3}N/AlN$ MQW layer 5 charged by the irradiation of the electron beam EB for a short time period, thus preventing the $Al_{0.7}Ga_{0.3}N/AlN$ MQW layer 5 from being electrostatically destroyed. In this case, the thickness $t_6$ of the aluminum metal back layer 6 is important. This is discussed below.

As stated above, since the thickness $t_5$ of the $Al_{0.7}Ga_{0.3}N/AlN$ MQW layer 5 is small, i.e., about 60 to 900 nm, the energy E of the electron beam EB for exciting the $Al_{0.7}Ga_{0.3}N/AlN$ MQW layer 5 should be smaller in view of the ultraviolet emission efficiency. Also, the energy E of the electron beam EB should be smaller in view of avoiding the affect of X-ray leakage. Therefore, in this case, the energy E of the electron beam EB is less than 10 keV, in other words, the speed or electrons of the electron beam EB is low. In order for low-speed electrons to pass through the aluminum metal back layer 6, the aluminum metal back layer 6 should be thinner. Note that, if the aluminum metal back layer 6 is thick, the electrons of the election beam EB are absorbed by the aluminum metal back layer 6, so that the $Al_{0.7}Ga_{0.3}N$/AlN MQW layer 5 cannot be sufficiently excited, thus decreasing the ultraviolet emission efficiency. In view of this, the aluminum metal back layer 6 should be as thin as possible.

Figure 4B:
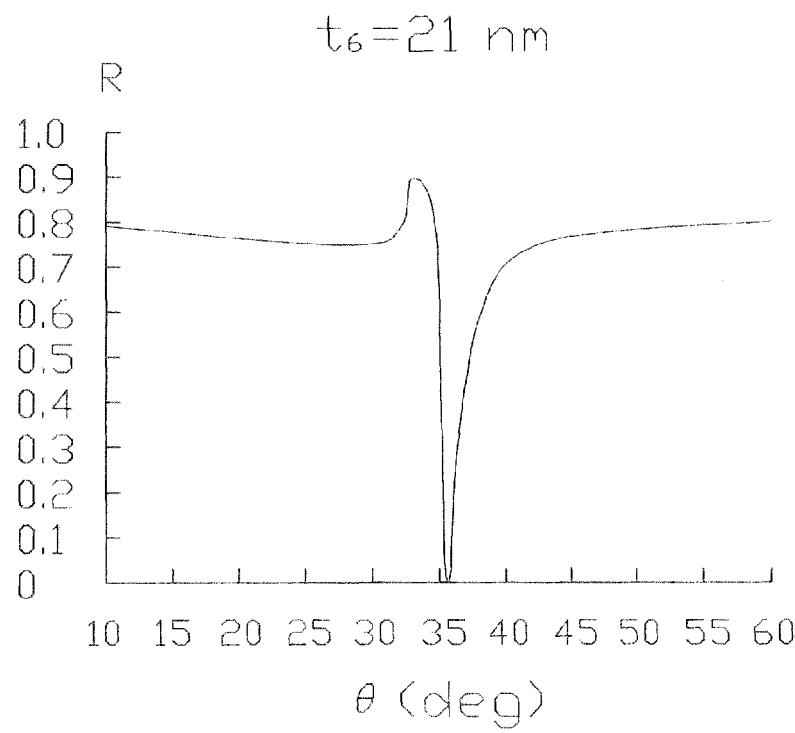
Figure 4C:
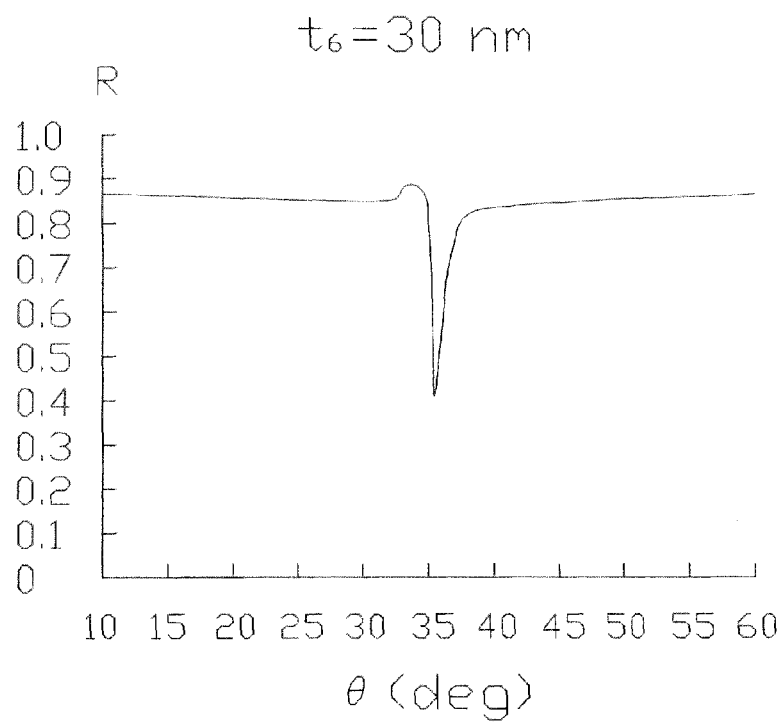
Figure 4D:
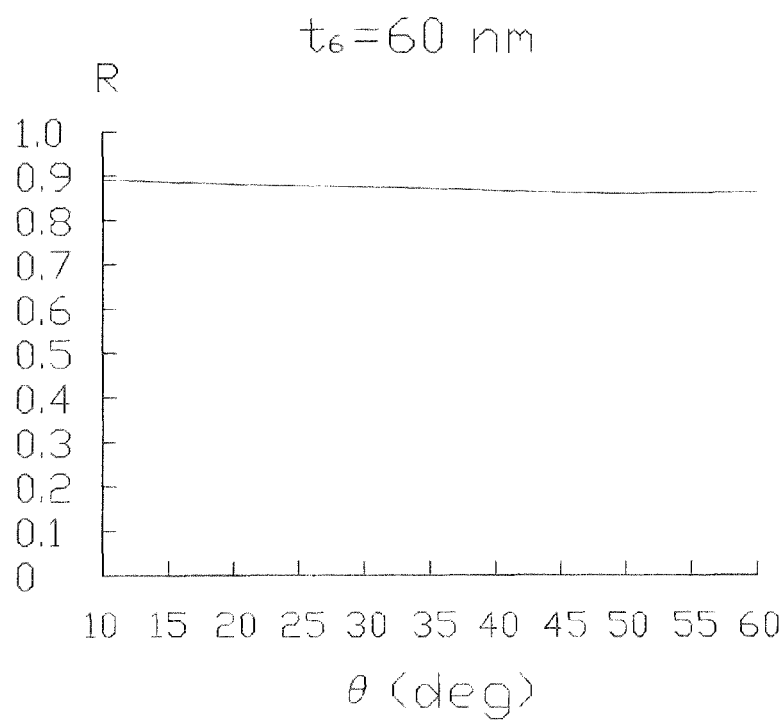

On the other hand, as illustrated in FIG. 4A, when the thickness $t_6$ of the aluminum metal back layer 6 is 10 nm, the reflectivity R of the aluminum metal back layer 6 is insufficient. Also, as illustrated in FIG. 4B, when the thickness $t_6$ of the aluminum metal back layer 6 is 21 nm, the reflectivity R of the aluminum metal back layer 6 is significantly reduced at the angle $\theta=36°$ due to the large surface plasmon resonance (SPR) absorption. Further, as illustrated in FIG. 4C, when the thickness $t_6$ of the aluminum metal back layer 6 is 30 nm, the reflectivity R of the aluminum metal back layer 6 is relatively high and the dip at the angle $\theta=36°$ due to the SPR absorption becomes small. Furthermore, as illustrated in FIG. 4D, the reflectivity R of the aluminum metal back layer 6 with 60 nm thickness is enough high due to no SPR absorption.

Note that, FIGS. 4A, 4B, 4C and 4D are ATR signal spectrum diagrams for explaining the thickness $t_6$ of the aluminum metal back layer 6 obtained by a simulation which calculates the reflectivity R of light reflected by the aluminum metal hack layer 6 through the AlN layers 2, 3 and 4 from the sapphire (0001) substrate 1. The simulation can be carried out by the simulation software WinSpall (trademark) developed by Max Plank Institute. In FIGS. 4A, 4B, 4C and 4D, the simulation conditions under the wavelength $\lambda=240$ nm of the deep-ultraviolet light DUV are as follows:

(1) For the sapphire (0001) substrate 1,
  the refractive index $n_1$ is 1.84; and
  the extinction coefficient $k_1$ is 0.
(2) For the AlN layers 2, 3 and 4,
  the refractive indexes $n_2$, $n_3$ and $n_4$ are 1.87; and
  the extinction coefficients $k_2$, $k$, and $k$, are O.
(3) For the aluminum metal back layer 6,
  the refractive index $n_6$ is 0.172; and
  the extinction coefficient $k_6$ is 2.79.

Thus, in order to minimize the absorption toss of the electron beam EB and maximize the reflectivity R of the deep-ultraviolet light Dry, the thickness $t_6$ of the aluminum metal back layer 6 is preferably about 30 to 60 nm.

Note that other material for the metal back layer for effectively reflecting the deep-ultraviolet light DUV may be silver (Ag); however, since the amount of silver is required to have a large electron beam stopping power is heavy, silver would absorb the electron beam EB, so that silver cannot excite the $Al_{0.7}Ga_{0.3}N$/AlN MQW layer 5 sufficiently, thus decreasing the ultraviolet emission intensity. After all, aluminum, which is light in weight, controllable and easy to be evaporated, is optimum for the metal back layer.

Next, the optimum thickness $t_5$ of the $Al_{0.7}Ga_{0.3}N$/AlN MQW layer 5 and the optimum energy E of the electron beam EB are discussed below.

Figure 5A:
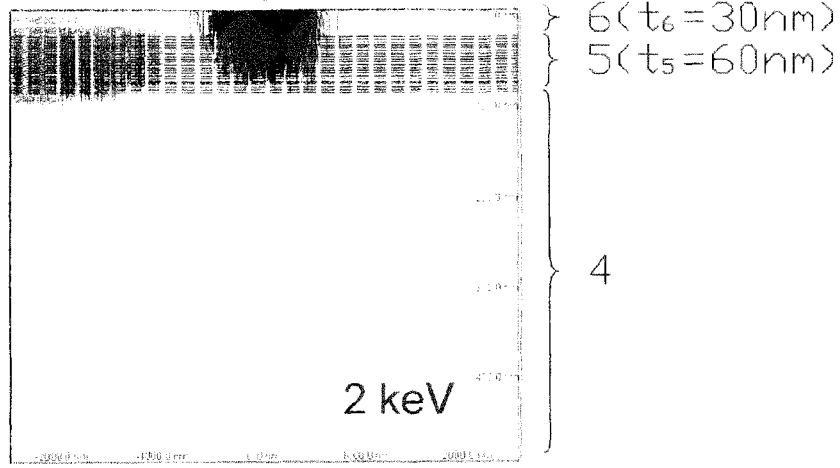
FIGS. 5A, 5B, 5C and 5D are results obtained by a Monte Carlo simulation method for explaining the diffusion of electrons of the electron beam of FIG. 1 where the thickness of the aluminum metal back layer is 30 nm, the thickness of the $Al_xGa_{1-x}N/AlN$ MQW layer is 60 nm and the energy of the electron beam is 2, 3, 4 and 6 keV.
Figure 5B:
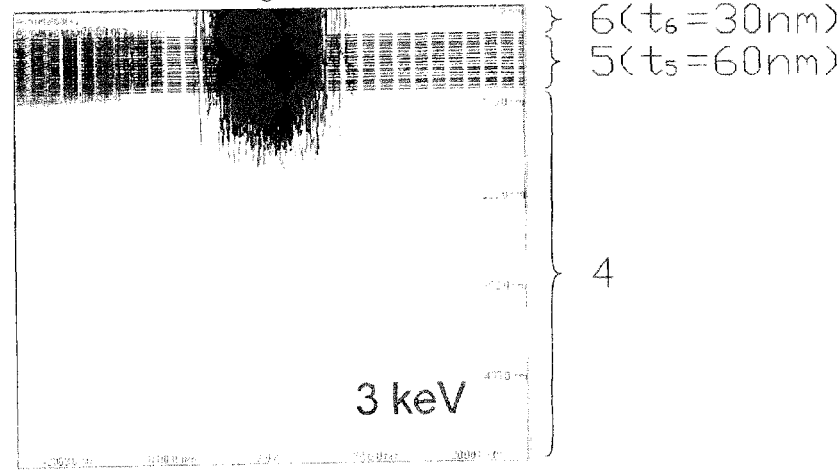
Figure 5C:
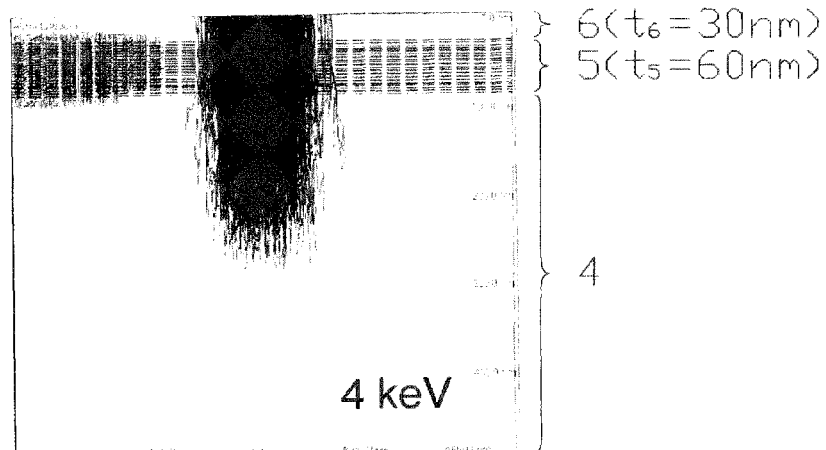
Figure 5D:
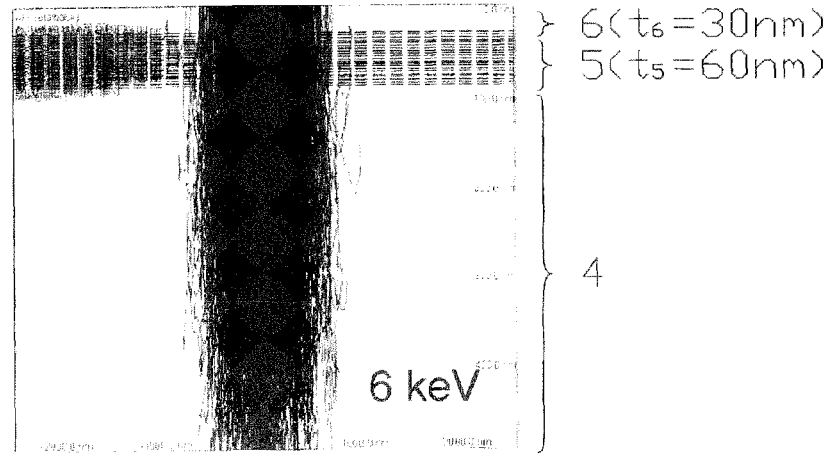

FIGS. 5A, 5B, 5C and 5D are diagrams illustrating the diffusion of electrons of the electron beam EB of FIG. 1 obtained by a Monte Carlo simulation method using the program CASINO (trademark) where the energy E of the electron beam EB is 2, 3, 4 and 6 keV, the beam diameter of the electron beam EB is 1 μm, the thickness $t_6$ of the metal back layer 6 is 30 nm, and the thickness $t_5$ of the $Al_{0.7}Ga_{0.3}N$/AlN MQW layer 5 is 60 nm. As illustrated in FIG. 5A, when E=2 keV, the electrons of the electron beam EB are completely absorbed by the $Al_{0.7}Ga_{0.3}N$/AlN MQW layer 5. Also, as illustrated in FIGS. 5B and 5C when E=3 keV or 4 keV, a part of the electrons of the electron beam EB pass through the $Al_{0.7}Ga_{0.3}N$/AlN MQW layer 5 to excite the AlN layer 4. Further, as illustrated in FIG. 5D, when L=6 keV or 4 keV, most of the electrons of the electron beam EB pass through the $Al_{0.7}Ga_{0.3}N$/AlN MQW layer 5 to excite the AlN layer 4. That is, one optimum energy E of the electron beam EB is present for each thickness $t_5$ of the $Al_{0.7}Ga_{0.3}N$/AlN MQW layer 5.

Incidentally, it is difficult even using the current highest technology to monitor the physical state of the deep-ultraviolet light DUV from the $Al_{0.7}Ga_{0.3}N$/AlN MQW layer 5 for the energy E of the electron beam EB; however, it is possible to monitor the physical state of the deep-ultraviolet light DUV by focusing on only the element Ga present through the semiconductor layers 2, 3, 4 and 5, because the intensity of characteristic X-rays (L-line spectrum) generated from the element Ga is assumed to be in proportion to the ultraviolet emission intensity of the deep-ultraviolet light DUV.

Figure 6A:
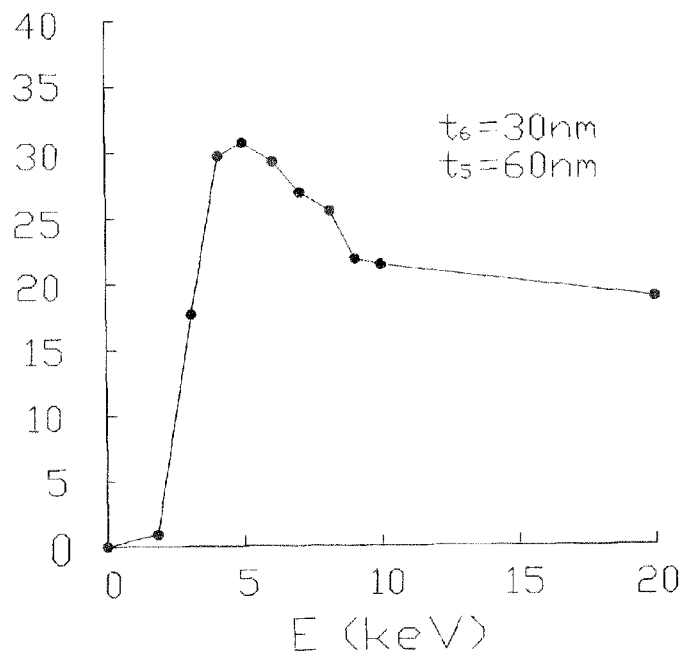
FIGS. 6A and 6B are graphs illustrating the electron beam energy to -ultraviolet-emission-intensity and -ultraviolet-emission efficiency characteristics, respectively, of the deep ultraviolet light source of FIG. 1 where the thickness of the $Al_xGa_{1-x}N/AlN$ MQW layer is definite.
Figure 6B:
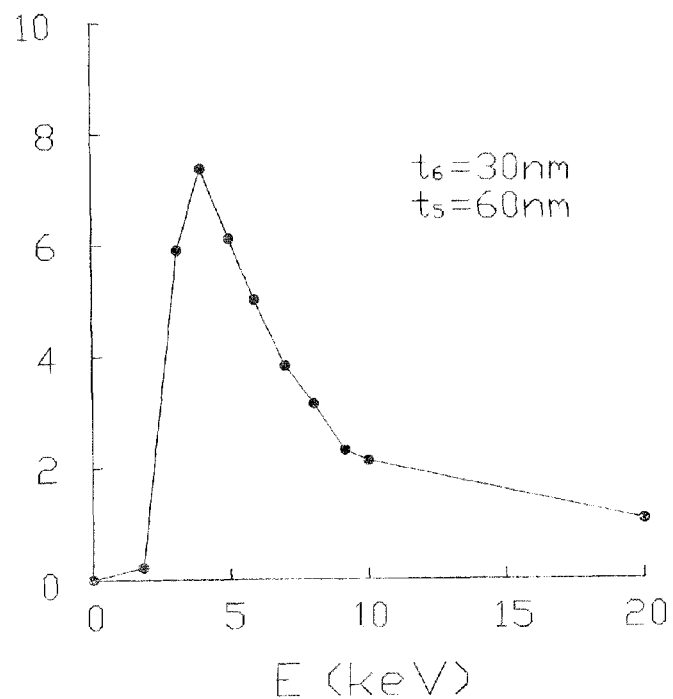

First, consider a case where the thickness $t_6$ of the aluminum metal back layer 6 is 30 nm and the thickness $t_5$ of the $Al_{0.7}Ga_{0.3}N$/AlN MQW layer 5 is definite, i.e., 60 nm. In this case, a ultraviolet emission intensity of the deep-ultraviolet light DUV from the $Al_{0.7}Ga_{0.3}N$/AlN MQW layer 5 is obtained by using a Monte Carlo method as a function of the energy E of the electron beam EB as illustrated in FIG. 6A. In FIG. 6A, the optimum energy E of the electron beam EB is 5 keV, and therefore, even if E>5 keV, the ultraviolet emission intensity of the deep-ultraviolet light DUV can not be increased. On the other hand, a ultraviolet emission efficiency or the deep ultraviolet light DUV from the $Al_{0.7}Ga_{0.3}N$/AlN MQW layer 5 is also obtained by using a Monte Carlo method as a function of the energy E of the electron beam EB as illustrated in FIG. 6B. In FIG. 6B, the optimum energy E of the electron beam EB is 4 keV, and therefore, even if E>4 keV, the ultraviolet emission efficiency of the deep-ultraviolet light DUV cannot be increased.

Thus, when the thickness $t_6$ of the aluminum metal back layer 6 is 30 nm and the thickness $t_5$ of the $Al_{0.7}Ga_{0.3}N$/AlN MQW layer 5 is definite, i.e., 60 nm, the optimum energy E of the electron beam EB is 4 to 5 keV. That is, in view of the above-described simulation result, the optimum energy E for the ultraviolet emission intensity is different from the optimum energy E For the ultraviolet emission efficiency. Therefore, when the ultraviolet emission intensity is important for the deep-ultraviolet tight DUV, 5 keV is used as the energy E of the electron beam EB, while, when the ultraviolet emission efficiency is important for the deep-ultraviolet light DUV, 4 keV is used as the energy E of the electron beam EB.

Figure 7A:
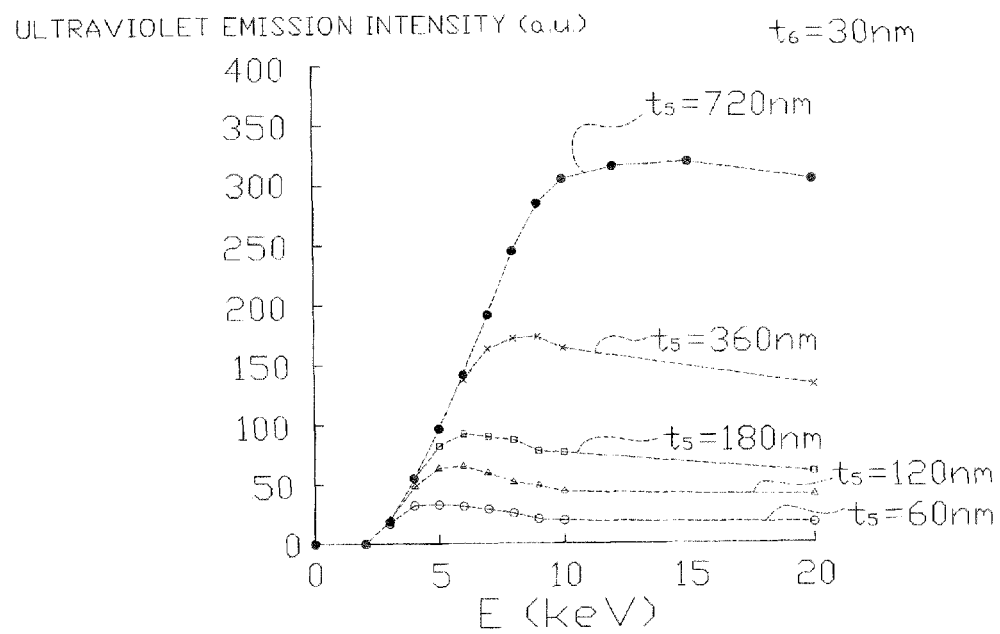
FIGS. 7A and 7B are graphs illustrating the electron beam energy to -ultraviolet-emission intensity and -ultraviolet-emission-efficiency characteristics, respectively, of the deep-ultraviolet light source of FIG. 1 where the thickness of the $Al_xGa_{1-x}N/AlN$ MQW layer is variable.
Figure 7B:
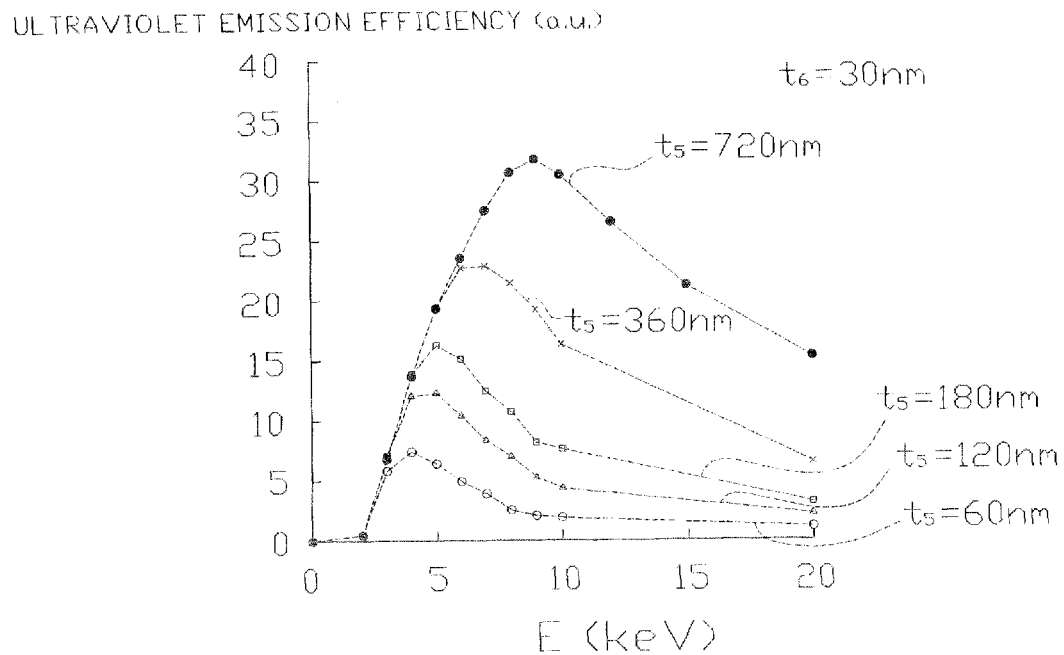

Next, consider a case where the thickness $t_6$ of the aluminum metal back layer 6 is 30 nm and the thickness $t_5$ of the $Al_{0.7}Ga_{0.3}N$/AlN MQW layer 5 is variable, i.e., 60 to 720 nm. In this case, a ultraviolet emission intensity of the deep-ultraviolet light DUV from the $Al_{0.7}Ga_{0.3}N$/AlN MQW layer 5 is obtained by using a Monte Carlo method as a function of the energy F of the electron beam EB as illustrated in FIG. 7A. In FIG. 7A, as the thickness $t_5$ of the $Al_{0.7}Ga_{0.3}N$/AlN MQW layer 5 is increased from 60 through 120 nm, 180 nm and 360 nm to 720 nm, the energy E of the electron beam EB for exciting the entire $Al_{0.7}Ga_{0.3}N$/AlN MQW layer 5 is increased. Even in this case, a maximum energy E of the electron beam EB is present. This maximum energy E is defined as an optimum energy $E_{op1}$. In this case, even if $E > E_{op1}$, the ultraviolet emission intensity of the deep-ultraviolet light DUV saturates or decreases. For example, when $t_5=60$ nm, $E_{op1}=50$. Also, when $t_5=120$ nm, $E_{op1}=6$ keV. Further, when $t_5=180$ nm, $E_{op1}=6$ keV. Furthermore, when $t_5=360$ nm. $E_{op1}=9$ keV. Still, when $t_5=720$ nm, $E_{op1}32$ 15 keV. In this case, the ultraviolet emission intensity of the deep-ultraviolet light DUV is maximum. Therefore, even if $E>E_{op1}$, the ultraviolet emission intensity of the deep-ultraviolet light DUV can not be increased. On the other hand, a ultraviolet emission efficiency of the deep-ultraviolet light DUV from the $Al_{0.7}Ga_{0.3}N/AlN$ MQW layer 5 is obtained by using a Monte Carlo method as a function of the energy E of the electron beam EB as illustrated in his 7B. In FIG. 7B, as the thickness $t_5$ of the $Al_{0.7}Ga_{0.3}N/AlN$ MQW layer 5 is increased from 60 through 120 nm, 180 nm and 360 nm to 720 nm, the ultraviolet emission efficiency is increased. Even in this case, a maximum energy E of the electron beam EB is present. This maximum energy E is defined as an optimum energy $E_{op2}$. In this case, even it $E>E_{op2}$, the ultraviolet emission efficiency of the deep-ultraviolet light DUV saturates or decreases. For example, when $t_5=60$ nm, $E_{op2}=4$ keV. Also, when $t_5=120$ nm, $E_{op2}=5$ keV Further, when $t_5=180$ nm, $E_{op2}=5$ keV. Furthermore, when $t_5=360$ nm, $E_{op2}=6.5$ keV. Still further, when $t_5=720$ nm, $E_{op2}=9$ keV. In this case, the ultraviolet emission efficiency of the deep-ultraviolet light DUV is maximum. Therefore, even if $E>E_{op2}$, the ultraviolet emission efficiency of the deep-ultraviolet light DUV can not be increased.

Thus, when the thickness $t_6$ of the aluminum metal back layer 6 is 30 nm and the thickness $t_5$ of the $Al_{0.7}Ga_{0.3}N/AlN$ MQW layer 5 is variable, at each thickness $t_5$ of the $Al_{0.7}Ga_{0.3}N/AlN$ MQW layer 5, the optimum energy E for the ultraviolet emission intensity is different from the optimum energy E for the ultraviolet emission efficiency. Therefore, when the ultraviolet emission intensity is important for the deep-ultraviolet tight DUV, the characteristics of FIG. 7A are used as the energy E of the electron beam EB, while, when the ultraviolet emission efficiency is important for the deep-ultraviolet light DUV, the characteristics of FIG. 7B are used as the energy E of the electron beam EB.

Figure 8:
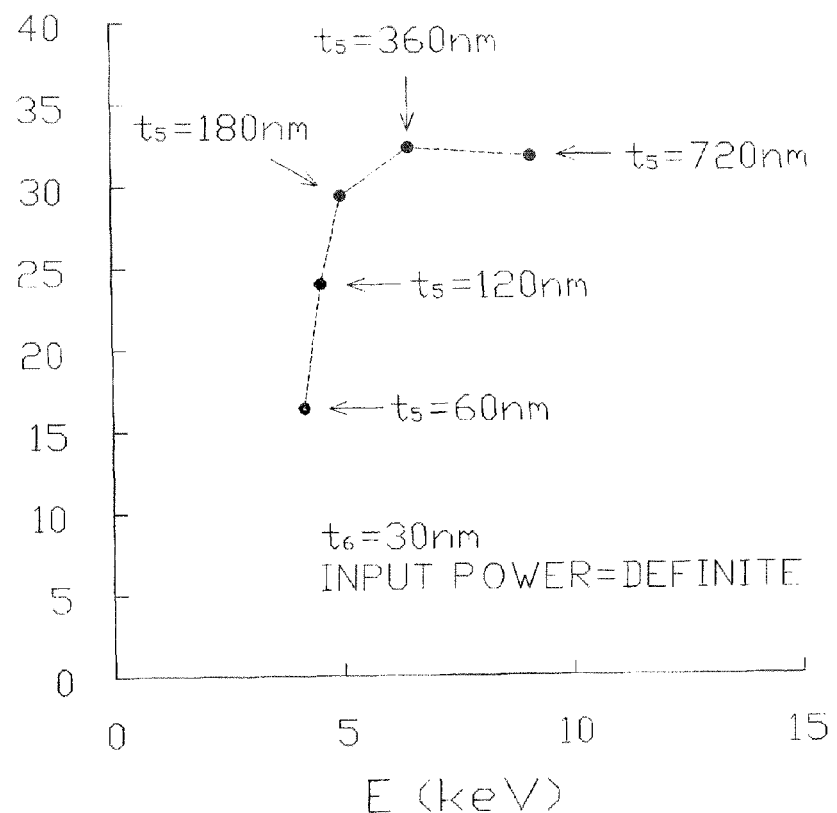
FIG. 8 Is a graph for explaining the electron beam energy-to-ultraviolet emission efficiency characteristics of the deep-ultraviolet light source of FIG. 1 where the thickness of the $Al_xGa_{1-x}N/AlN$ MQW layer is variable.

Thus, when the thickness t, of the aluminum metal back layer 6 is 30 nm and an input power designated by a multiplication between an acceleration voltage and an acceleration current is definite, the relationship between the maximum ultraviolet emission efficiency and the optimum energy $E_{OP2}$ of the electron beam EB when the thickness $t_5$ of the $Al_{0.7}Ga_{0.3}N/AlN$ MQW layer 5 is 60 nm, 120 nm, 180 nm, 360 nm and 720 nm is illustrated in FIG. 8. That is, the optimum thickness $t_5$ of the $Al_{0.7}Ga_{0.3}N/AlN$ MQW layer 6 is about 300 to 400 nm, thus exhibiting maximum ultraviolet emission efficiency. Also, the optimum energy E of the electron beam EB is about 6 to 7 keV. Note that the above-mentioned Monte Carlo method is carried out under the stoichiometric ratio of $Al_{0.7}Ga_{0.3}N$, i.e., Al:Ga:N=0.7:0.3:1. If this stoichiometric ratio is changed, the optimum thickness of the MQW layer and the optimum energy of the electron beam EB are changed. However, qualitatively, the larger the amount of Ga in the MQW layer, the thinner the MQW layer. This is because the element Ga is heavier than the elements Al and N, and therefore, Ga has a larger electron beam stopping power than Al and N.

Figure 9:
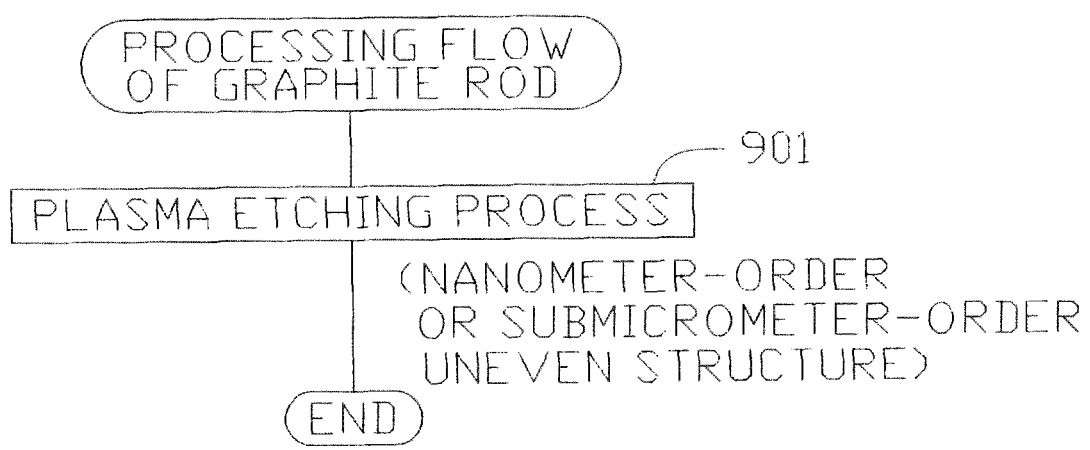
FIG. 9 is a flowchart for forming a graphite nanometer-order or submicrometer-order needle rod as the electron emission source of FIG. 1.

The electron emission source 7 of FIG. 1 is constructed by a graphite nanometer-order or submicrometer-order needle rod which is manufactured by a flowchart as illustrated in FIG. 9.

At step 901, a plasma etching process using hydrogen ($H_2$) gas as a processing gas is performed upon a graphite rod as illustrated in FIG. 10A, to obtain a graphite rod whose nanometer-order or submicrometer-order uneven rod-shaped surface is illustrated in FIG. 10B. The plasma etching conditions are as follows:

Radio frequency (BF) power: 100 to 1000 W;
Pressure: 133 to 13300 Pa (1 to 100 Torr);
Flow rate of oxygen: 5 to 500 sccm; and
Etching time: 1 to 100 minutes.

Note that the plasma etching process at step 901 of FIG. 9 may be an electron cyclotron resonance WOO process, a reactive ion etching (RIE) process or an atmospheric plasma etching process. Also, the processing gas may be Ar gas, $N_2$ gas, $O_2$ gas, $CF_4$ gas and so on in addition to $H_2$ gas.

Figure 11:
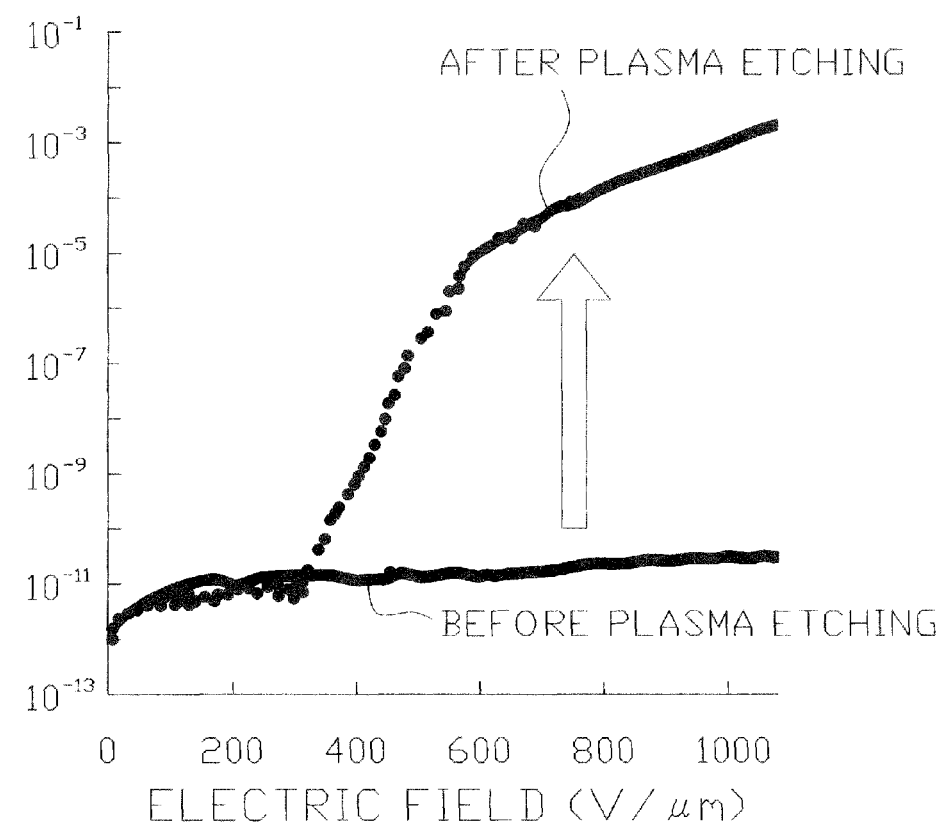
FIG. 11 is a graph illustrating the electric field-to-current density of the graphite nanometer-order or submicrometer-order needle rod for the electron emission source of FIG. 1.

The graphite nanometer-order or submicrometer-order needle rod exhibits excellent electron emission characteristics as illustrated in FIG. 11.

Figure 12:
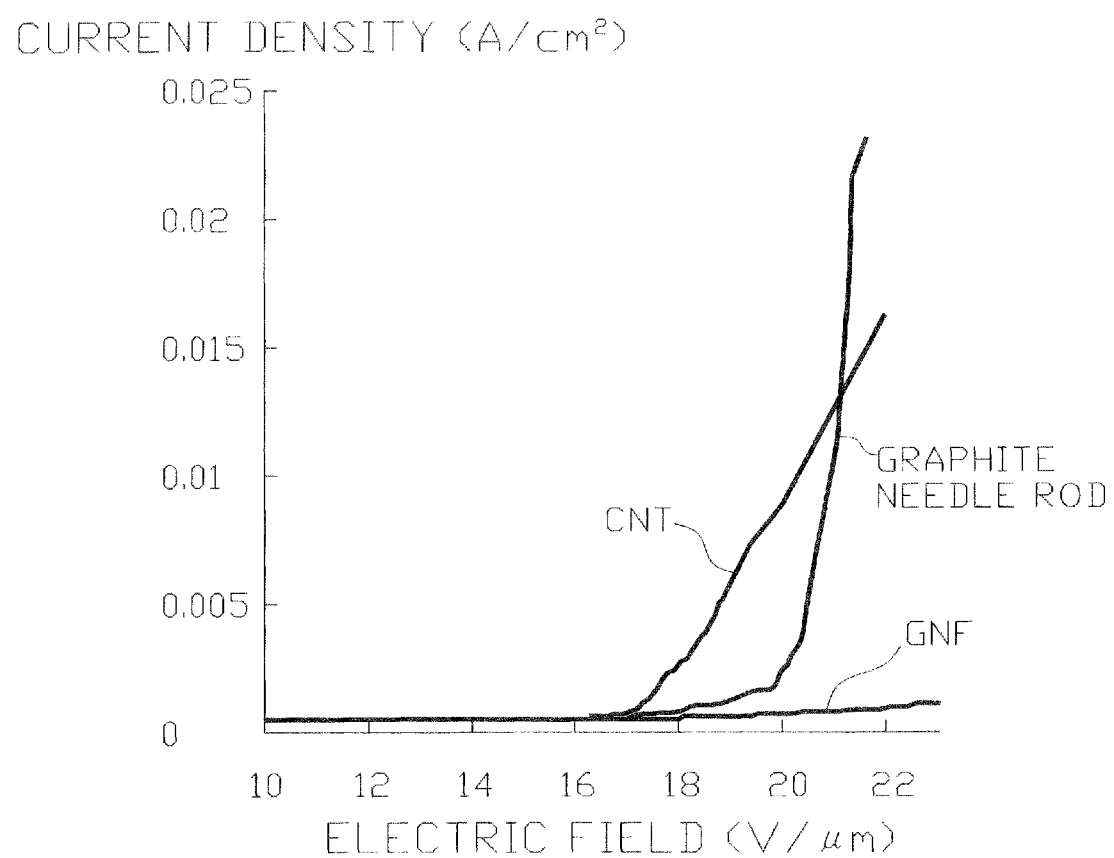
FIG. 12 is a graph comparing the electric field-to-current densities obtained by the graphite nanometer-order or submicrometer-order needle rod, carbon nanotube (CNT), and graphite nanometer-order fiber (GNF) for the electron emission source of FIG. 1.

As illustrated in FIG. 12, the graphite nanometer-order or submicrometer-order needle rod has a higher emission current density than other materials such as carbon nanotubes (CNT) and graphite nanometer-order fiber (GNF). Therefore, when the graphite nanometer-order or submicrometer-order needle rod is combined with a conductive cathode body, the adhesion properties of the graphite nanometer-order or submicrometer-order needle rod, the reduction of voltage at interface between the graphite nanometer-order or submicrometer-order rod and the conductive cathode body, the deterioration (current saturation) of the electron emission characteristics and the cathode destruction due to the concentration of an electric field at the above-mentioned interface can be improved.

Figure 13:
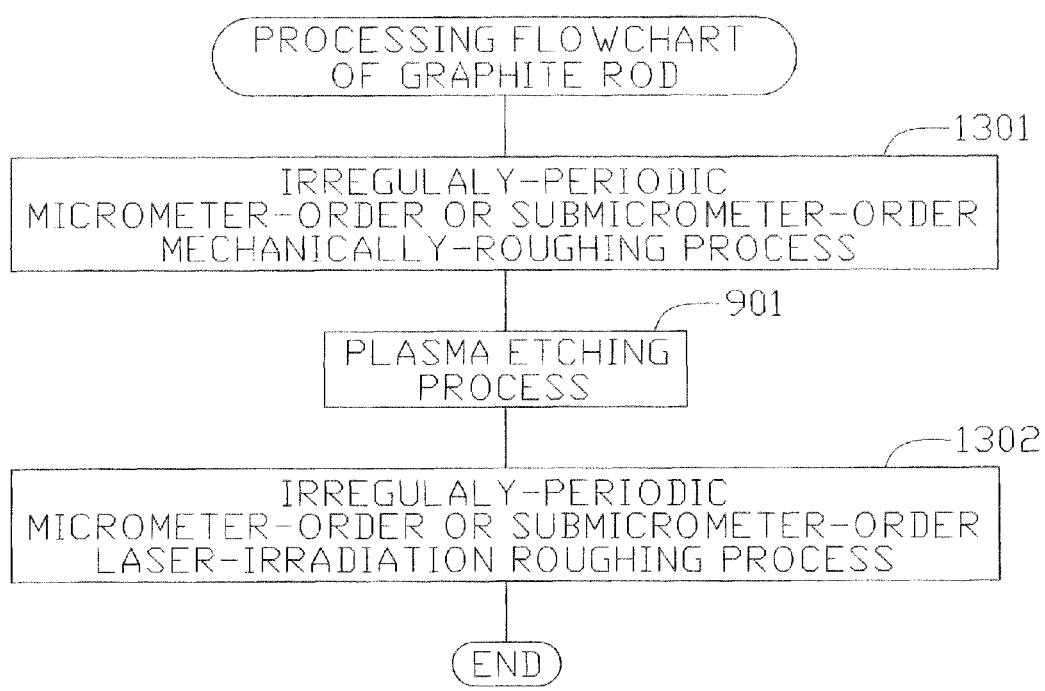
FIG. 13 is a flowchart of a modification of the flowchart of FIG. 9.

In FIG. 13, which is a modification of the flowchart of FIG. 9, micrometer-order or submicrometer-order irregularly-periodic roughening steps 1301 and 1302 are added before and after step 901 of FIG. 9.

A roughening process by a mechanical roughening process using sandblast or the like at step 1301 and a surface roughening process using a high power laser such as a $CO_2$ laser, an yttrium-aluminum-garnet (YAG) laser or an excimer laser at step 1302 are performed upon the surface of the graphite rod, to form a micrometer-order or submicrometer-order irregularly-periodic uneven structure on the surface of the graphite rod, to substantially increase the surface area thereof, which would increase the emissivity of electrons.

Note that, only one of the roughening processes at step 1301 and 1302 may be carried out. In this case, the roughening process at step 1301 is preferably carried out in order not to destroy the graphite nanometer-order or micrometer-order uneven structure.

Note that, at step 1301 of FIG. 13, a large number of irregularly-periodic grooves on the micrometer-order or submicrometer-order can be formed at the surface of the graphite rod instead of the irregularly-periodic uneven structure on the micrometer-order or submicrometer-order. For example, a photoresist pattern is formed on the surface of the graphite rod by using a photomask with an irregularly-periodic pattern, and then, a plasma etching process such as an RIE process using $H_2$ gas and/or $O_2$ gas is performed upon the graphite rod with the photoresist pattern, which is finally removed. Otherwise, a cutting process using a mechanical ruling engine is performed upon the surface of the graphite rod to form a micrometer-order or submicrometer-order irregularly-periodic spiked-holder (or pinholder) type unevenness on the surface of the graphite rod, to thereby increase the surface area thereof. The above-mentioned spiked-holder type structure can be realized by forming a mold with a reverse spiked-holder type structure and then pouring liquid graphite material such as carbon black into the mold.

Note that the energy E of the electron beam EB emitted from the electron emission source 7 can be either fixed or variable. In this case, the thickness $t_1$ of the sapphire (0001) substrate 1 is set in accordance with the energy E of the electron beam EB. For example, when E=6 keV, the thickness $t_1$ of the sapphire (0001) substrate 1 is larger than 216 μm.

When E=10 keV, the thickness $t_1$ of the sapphire (0001) substrate 1 is larger than 1000 μm. If the energy E of the electron beam E is variable, the thickness $t_1$ of the sapphire (0001) substrate 1 is set in accordance with the upper limit energy E of the electron beam EB. Therefore, if the upper limit energy E of the electron beam EB is larger than 10 keV, the thickness $t_1$ of the sapphire (0001) substrate 1 is set to be larger than 1000μm.

Figure 14:
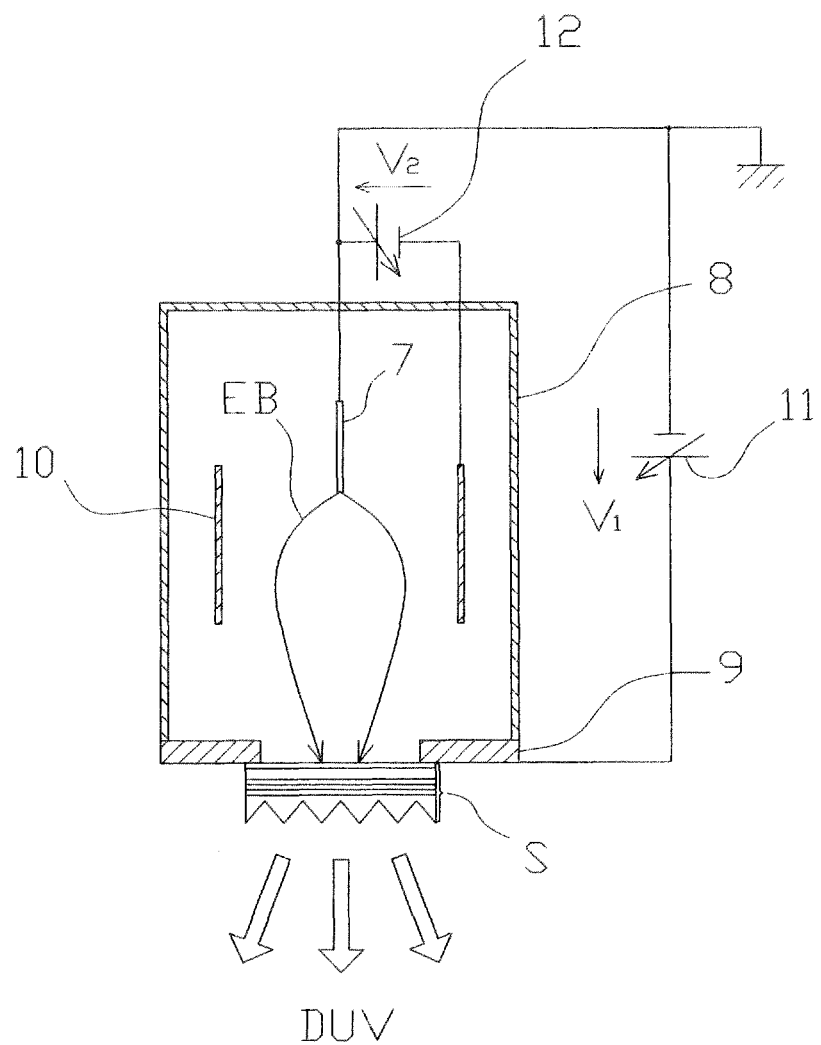
FIG. 14 is a partly-cross-sectional view of an actual deep-ultraviolet light source obtained by assembling the deep-ultraviolet light source of FIG. 1.

In FIG. 14, which illustrates an actual deep-ultraviolet light source obtained by assembling the deep-ultraviolet light source of FIG. 1, a stacked body S formed by the sapphire (0001) substrate 1, the Al buffer layer 2, the grating AlN layer 3, the AlN layer 4, the $Al_{0.7}Ga_{0.3}N/AlN$ MQW layer 5 and the aluminum metal back layer 6, and the electron emission source 7 formed by the graphite nanometer-order or submicrometer order needle rod are vacuum-sealed by stem pins (vacuum introduction terminals or the like) (not shown) in a glass tube 8 and an anode electrode 9 which is welded to the glass tube 8. Also, the anode electrode is a perforated metal plate or the like or a metal structure evaporated on the glass tube 8. In this case, if the anode electrode 9 is a perforated metal plate, the glass tube 8 is moved stepwise toward the anode electrode 9 in order to easily weld the anode electrode 9 to the glass tube 8.

Next, the stacked body S is adhered to the anode electrode 9 by indium (In) seal or the like, in such a way that the opening of the glass tube 8 is covered to maintain a vacuum state in the glass tube 8. Note that conductive material can be used instead of the indium seal. Since the aluminum metal back layer 6 of the stacked body 8 is electrically connected to the anode electrode 9 through the indium seal or the like, charges can be removed from the stacked body S to the anode electrode 9.

Additionally, a cylindrical electrostatic lens 10 for focusing the electron beam EB of the electron emission source 7 onto the stacked body S is fixed on the cathode side in the glass tube 8 by stem pins or the like in advance.

Since the electron emission source 7 is constructed by the graphite nanometer-order or submicrometer-order needle rod, this needle rod can be perpendicular to the plane of the stacked body S, so that the glass tube 8 can be small in size, that is, the entire deep-ultraviolet light source can be small in size.

In FIG. 14, the glass tube 8 serves as a diode tube, the stem pins are welded in such a way that the distance between the needle rod of the electron emission source 7 and the anode electrode 9 is a predetermined value. For example, this distance is about 0.5 mm/keV·V (keV) where V (keV) is the voltage between the electron emission source 7 and the anode electrode 9.

A DC power supply 11 applies a DC voltage $V_1$ between the anode electrode 9 and the electron emission source 7 to give a low potential to the electrons of the electron beam EB while a DC power supply 12 applies a DC voltage $V_2$ between the electron emission source and the electrostatic lens 10 to give a high potential to the electrons of the electron beam EB.

In order to stably operate the electron emission source 7 consisting of the graphite nanometer-order or submicrometer-order needle rod to increase the lifetime of the deep-ultraviolet light source, only the degree of vacuum of the glass tube 8 has to be increased. In this case, while the degree of vacuum of the conventional field emission type electron emission needs to be higher than $10^{-7}$ Pa, the degree of vacuum of the electron emission source 7 consisting o the graphite nanometer-order or submicrometer-order needle rod needs to be only about $10^{-7}$ Pa. Therefore, the vacuum sealing time can be remarkably decreased, so that the lead time can be decreased and therefore, the manufacturing cost can be decreased. Note that, in order to maintain the high degree of vacuum, getters or the like can be sealed in the glass tube 8.

Figure 15:
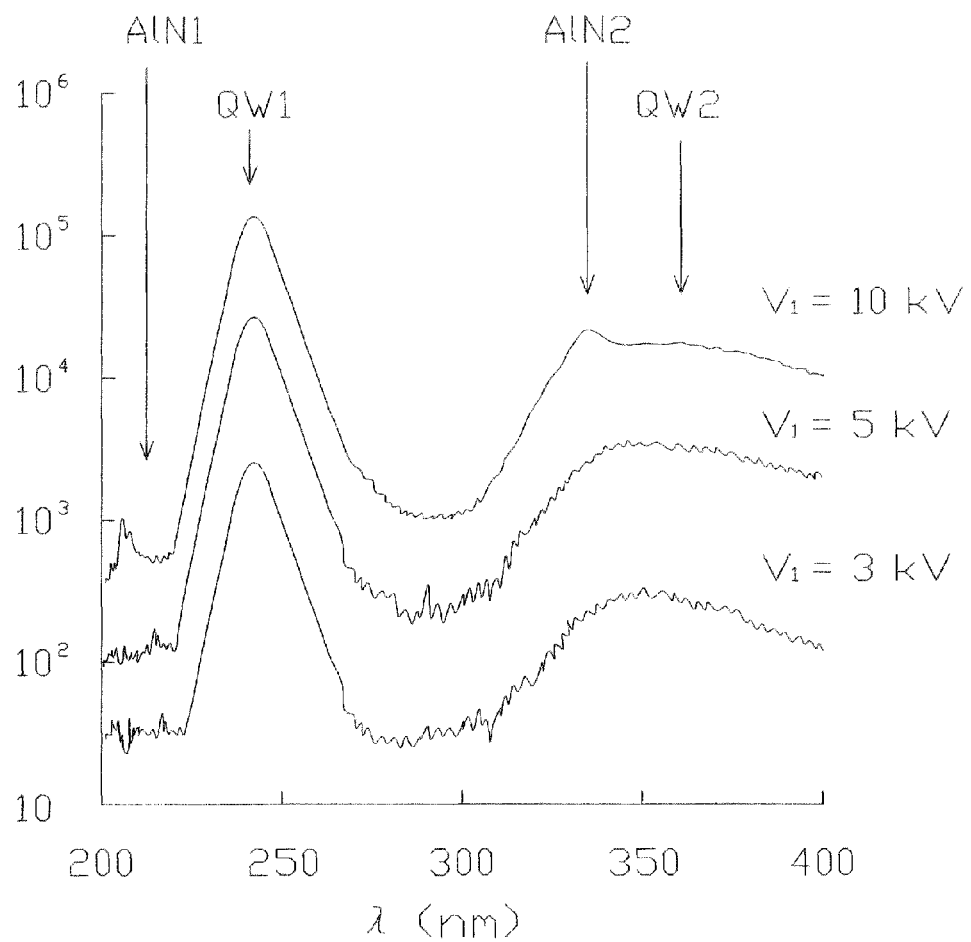
FIG. 15 is a graph illustrating a ultraviolet emission spectrum of the deep-ultraviolet light source of FIG. 14.

FIG. 15 is a diagram illustrating a ultraviolet emission spectrum of the deep-ultraviolet light source of FIG. 14 where the DC voltage $V_1$ is 3 kV, 5 kV and 10 kV. Here, assume that the thickness $t_2$ of the $Al_{0.7}Ga_{0.3}N/AlN$ MQW layer 5 is 60 nm.

In FIG. 15, AlN1 indicates ultraviolet emission light from the AlN layers 2, 3 and 4; QW1 indicates ultraviolet emission light from the $Al_{0.7}Ga_{0.3}N/AlN$ MQW layer 5; AlN2 indicates ultraviolet emission light from the defects of the AlN layers 2, 3 and 4; and QW2 indicates ultraviolet emission light from a deep level of the $Al_{0.7}N/AlN$ MQW layer 5. From the ultraviolet emission efficiency and the ultraviolet emission spectrum of FIG. 15, the characteristics at $V_1=5$ kV are superior to those at $V_1=3$ kV and 10 kV. In the characteristics at $V_1=5$ kV, the current of the electron beam EB is 0.2 mA, the input power is 1 W=5 kV·0.2 mA), and the ultraviolet emission efficiency of the deep-ultraviolet light DUW is about 10%. In FIG. 14, if the thickness $t_5$ of the $Al_{0.7}Ga_{0.3}N/AlN$ MQW layer 5 is 300 to 100 nm, the ultraviolet emission efficiency of the deep-ultraviolet light DUW can be theoretically larger than twice the above-mentioned ultraviolet emission efficiency 10%, i.e., larger than 20%.

Figure 16:
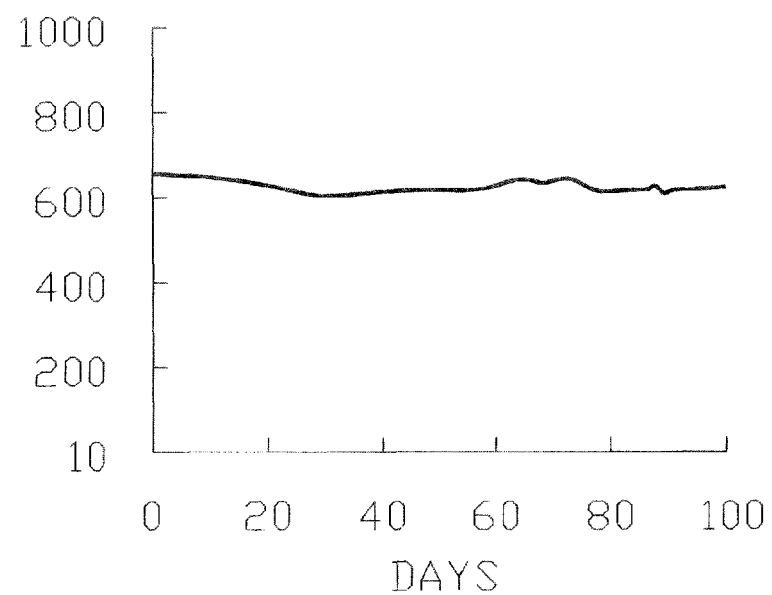
FIG. 16 is a timing diagram illustrating ultraviolet emission intensity for explaining the lifetime of the deep-ultraviolet light source of FIG. 14.

In FIG. 16, which illustrates a ultraviolet emission intensity for explaining the lifetime of the deep ultraviolet light source of FIG. 14, the deep-ultraviolet light source of FIG. 14 maintains a stable ultraviolet emission intensity for 2400 hours (=24 hours×100 days). Therefore, the lifetime is expected to be 40, 000 hours in view of the exponential function-type lifetime prediction, and would be longer than that of the prior art deep-ultraviolet tight source while maintaining a high ultraviolet emission intensity and a high ultraviolet emission efficiency.

In the above-described embodiment, although the $Al_{0.7}Ga_{0.3}N/AlN$ MQW layer 5 is used as it wide band gap semiconductor, other $Al_{0.7}Ga_{0.3}N/AlN$ ($0.2 \leq x \leq 0.8$) MQW layers except for x=0.7 can be used as such a wide band gap semiconductor. Also, a nitride layer such as a BN layer can be used as such a wide band gap semiconductor.

Also note that the nanometer-order means a range from about 1 to 99 nm, and the submicrometer-order means a range from about 0.1 to 0.99 μm.

It will be apparent to those skilled in the art that various modifications and variations can be made in the presently disclosed subject matter without departing from the spirit or scope of the presently disclosed subject matter. Thus, it is intended that the presently disclosed subject matter covers all modifications and variations of the presently disclosed subject matter provided they come within the scope of the appended claims and their equivalents. All related or prior art references described above and in the Background section of the present specification are hereby incorporated in their entirety by reference.

The invention claimed is:

1. A deep-ultraviolet light source comprising:
a sapphire substrate;
a wide hand gap semiconductor layer having a wavelength smaller than 300 nm, formed on said sapphire substrate; and
an electron beam source for irradiating said wide band gap semiconductor layer with an electron beam,
said wide band gap semiconductor layer being configured to be irradiated with said electron beam to emit deep-ultraviolet light through said sapphire substrate,
a thickness $t_1$ of said sapphire substrate satisfying:

$t_1 \geq \alpha \cdot E^3$ where E is an energy of said electron beam (keV); and α is 1 μm/$(keV)^3$.

2. The deep-ultraviolet light source as set forth in claim 1, wherein said wide band gap semiconductor layer comprises an $Al_xGa_{1-x}N$/AlN (0.2≧x≧0.8) multiple quantum well layer consisting of periods of one $Al_xGa_{1-x}N$ well layer and one AlN barrier layer.

3. The deep-ultraviolet light source as set forth in claim 2, further comprising a 30 to 60 nm thick aluminum metal back layer formed on said $Al_xGa_{1-x}N$/AlN multiple quantum well layer.

4. The deep-ultraviolet light source as set forth in claim 2, wherein a thickness of said $Al_xGa_{1-x}N$/AlN multiple quantum well layer is 300 to 400 nm, and said energy of said electron beam is 6 to 7 keV.

5. The deep-ultraviolet light source as set forth in claim 1, further comprising an electron emission source including a graphite nanometer-order or submicrometer-order needle rod for generating said electron beam.

6. The deep-ultraviolet light source as set forth in claim 1, wherein a light taken out surface of said sapphire substrate is an uneven surface whose period is larger than 750 nm and whose aspect ratio is larger than 1.

7. The deep ultraviolet light source as set forth in claim 1, further comprising an electrostatic lens for focusing said electron beam Onto said wide band gap semiconductor layer.

8. The deep-ultraviolet light source as set forth in claim 1, wherein said energy of said electron beam is 4 keV to 15 keV.

9. The deep-ultraviolet light source as set forth in claim 1, further comprising a vacuum glass tube for mounting said electron beam source therein.

10. The deep-ultraviolet light source as set forth in claim 9, wherein said wide band gap semiconductor layer is adhered to said vacuum glass tube.

* * * * *